Jan. 14, 1930.　　　A. CHADWICK　　　1,743,426
BIRD CAGE
Filed April 2, 1926
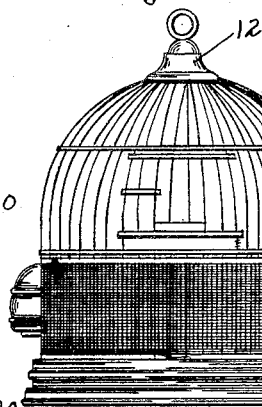
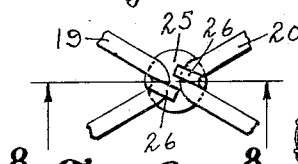
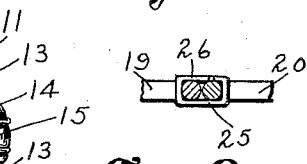
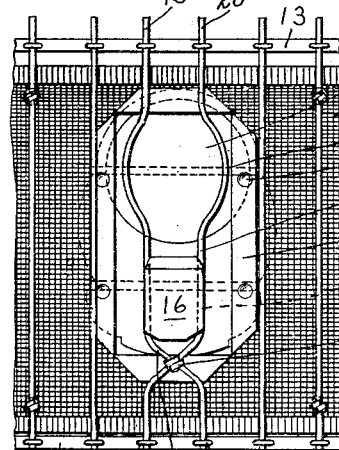
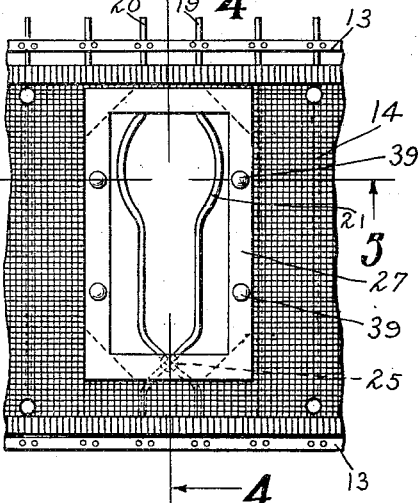
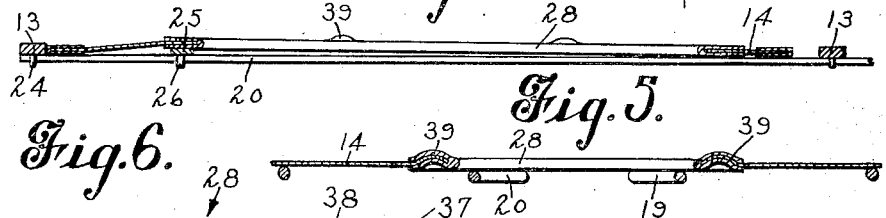
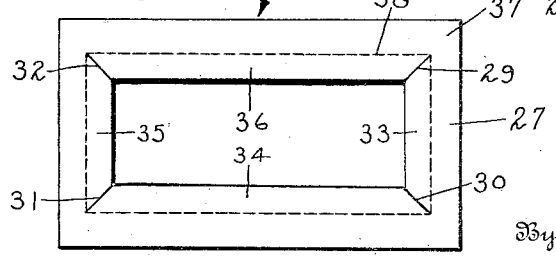
Inventor
Alfred Chadwick
By Harry E. Rockwell
Attorney Patented Jan. 14, 1930

1,743,426

UNITED STATES PATENT OFFICE

ALFRED CHADWICK, OF NEW HAVEN, CONNECTICUT, ASSIGNOR TO THE ANDREW B. HENDRYX COMPANY, OF NEW HAVEN, CONNECTICUT

BIRD CAGE

Application filed April 2, 1926. Serial No. 99,374.

This invention relates to cages, and more especially to a bird cage and to improvements in the construction thereof.

It is usual to provide feeding and drinking cups, which are detachable from the cage for filling and cleaning. These cups are generally secured to the cage by the cooperation between a part of the cage and a portion of the cups. An opening is usually provided in a guard screen or the like where these cups are attached so as to allow access to the cups by the occupant of the cage.

One of the objects of this invention is to provide means whereby a portion of the cage will be adapted to cooperate with a portion of the cup to securely retain the same in place.

Another object of this invention is to improve the structure of the cage by providing a novel form of binding for the edges of the opening in the guard.

Still another object of this invention is to generally improve the construction of bird cages or the like, whereby the same will be rigid in structure, inexpensive to manufacture, artistic in appearance, and wherein the cooperating parts thereof will be efficient in use.

To these and other ends the invention consists in the novel features and combination of parts to be hereinafter described and claimed.

In the accompanying drawings:

Fig. 1 is an elevation of a bird cage, embodying the features of this invention;

Fig. 2 is an elevation of a portion of a bird cage at the opening in the guard screen thereof;

Fig. 3 is a rear view of the parts shown in Fig. 2;

Fig. 4 is a section on line 4—4 of Fig. 2;

Fig. 5 is a section on line 5—5 of Fig. 2;

Fig. 6 is a development of the binding;

Fig. 7 is an enlarged rear view of means to secure portions of the cage together;

Fig. 8 is a section on line 8—8 of Fig. 7, parts thereof not being shown in section for the sake of clearness.

The bird cage shown in the drawings comprises the usual base portion 10, and the body portion 11. The body portion 11, in this instance, is composed of a plurality of spaced apart bars extending upwardly from the base portion 10 and converging into the top cap 12. The spaced apart bars are retained in spaced relation by being secured to horizontally disposed rails 13. A guard screen 14 extends peripherally about the body portion 11, adjacent the base portion 10. A pair of feed cups 15 are provided and are secured to the cage at opposite sides thereof.

The feed cups 15 have an inwardly directed lug 16 upon their inner surface. The lug 16 is provided with a groove 17 upon each of the sides thereof. The lug is adapted to pass through an opening 18 in the guard screen and between bars 19 and 20, two of the bars forming the cage structure. The bars 19 and 20 are bowed apart at 21 to readily allow the passage of the lug 16 therebetween and are brought toward each other at 22 so that each will engage the lug within the groove in the side adjacent thereto when the cup is forced downwardly.

In the improved form of cage as illustrated, the bars 19 and 20 are brought toward each other below the lug 16, as at 23, into substantially an abutting relation and are then spread so as to pass through the retaining staples 24 upon a lower horizontal rail 13. At 23 the bars are tied together by means of a button 25, which is provided with tongues 26 integrally depending from its edge. The tongues 26 are bent toward each other over the bars 19 and 20, and bind them together. When so bound or tied together, the bars 19 and 20 more securely grip the lug 16 of the cup 15 and prevent it from working upwardly and becoming detached from the cage or from becoming loose and rattling should the cage be vibrated. This increased grip upon the lug 16 is due to the increased spring tension of the bars 19 and 20 provided by the above described novel structure.

The edges of the opening 18 in the guard screen 14 are provided with an improved form of binding 27 by the use of which no rough or sharp edges are presented which will possibly injure the occupant of the cage, and whereby the cage is given a neater and more artistic appearance. The edge binding member 27 is formed from one piece of material by punching out a blank 28, as shown in Fig. 6.

The blank 28 by the cuts 29 to 32, inclusive, is provided with tongues 33 to 36, inclusive, which are adapted to be bound upon the dotted lines 38, shown in Fig. 6, and a surrounding edge or margin portion 37. When applied to the guard screen the tongues 33 to 36, inclusive, will enter the opening 18 and are bent about the edges thereof and over the rear surface of the guard screen whereby the margin portion 37 will be drawn into close contact with the outer surface of said guard screen.

To hold the binding 27 more securely in position, insets 39 (see Fig. 5) are made in the margin portion 37. The insets 39 are formed by depressing the material of the tongues outwardly at a convenient point thereby forcing the material of the guard screen outwardly, which in turn forces the marginal portion 37 outwardly. An inset of this form interlocks the tongue, guard screen, and marginal portion and provides an especially rigid securing means between the same.

While I have shown and described a preferred embodiment of my invention, it is to be understood that the same is not limited to the exact form shown, as modifications and variations thereof are possible which will lie within the spirit of the invention and the scope of the appended claims.

What I claim is:

1. A bird cage having a base portion and a body portion, said body portion comprising spaced bars and horizontally disposed rails, a guard screen having an opening therein surrounding said body portion, a food cup having a portion thereof extending through the opening in said screen, said food cup portion being engaged by and between a pair of said spaced bars, and means adjacent said food cup portion and intermediate a pair of rails to bind said pair of spaced bars together to provide a spring grip thereof upon said food cup portion therebetween to retain the same against accidental displacement therefrom.

2. A bird cage having a base portion and a body portion, said body portion comprising spaced bars and horizontally disposed rails, a guard screen having an opening therein surrounding said body portion, a food cup having a portion thereof extending through the opening in said screen, said food cup portion being engaged by and between a pair of said spaced bars, said spaced bars being brought together below said food cup portion and secured to each other intermediate a pair of rails to provide a spring grip upon said food cup portion to retain the same against accidental displacement therefrom.

3. A bird cage having a base portion and a body portion, said body portion comprising spaced bars and horizontally disposed rails, a guard screen having an opening therein surrounding said body portion, a food cup having a portion thereof extending through the opening in said screen, said food cup portion being engaged by and between a pair of said spaced bars, said spaced bars being brought together below said food cup portion, a button having a pair of tongues depending from opposite edges thereof and bent about said bars to secure the same together whereby a spring grip is provided upon said food cup portion between said bars to retain the same against accidental displacement therefrom.

4. In a bird cage, a body portion comprising spaced bars and horizontally disposed rails, said spaced bars extending between a pair of said horizontally disposed rails and secured thereto, a pair of said bars being bent toward each other intermediate said rails and secured together at the adjacent portions thereof to provide a spring grip upon an article engaged by and between said pair of bars to retain said article therebetween.

5. In a bird cage, a body portion having vertically disposed bars, said body portion being surrounded by a guard screen, said guard screen having a rectangular opening therein to permit the insertion of a portion of a feed box between a pair of said bars, a one-piece binding secured to the edges of the opening in said guard screen, said binding extending through the opening and overlapping the edges thereof, and separated insets formed in the material of the overlapping portion to clamp the screen and the binding together.

6. In a bird cage, a body portion, said body portion being surrounded by a guard screen, said guard screen having a rectangular opening therein, a one-piece binding secured to the edges of the opening in said guard screen, said binding extending through the opening and overlapping the edges thereof on both sides of said screen, and spaced apart insets depressed in the material of the overlapping portion of said binding to clamp the screen against the outer portion of said binding.

7. In a bird cage, a body portion surrounded by a guard screen, said guard screen having a rectangular opening therein, a binding to cover the edge of the opening in said screen, said binding comprising a flat rectangular piece of material, said piece of material having a rectangular opening therein, a tongue at each of the side edges of the rectangular opening in said piece of material, said tongues being adapted to pass through the opening in the said screen and be bent over the edges thereof to secure said binding in place and insets depressing the material of one of said tongues outwardly to force the material of the screen and the marginal portion of the binding outwardly to interlock the parts together.

8. In a bird cage, a pair of vertically extending spaced apart bars adapted to receive and retain an article therebetween, said bars being secured to and between a pair of horizontally disposed rails, and a clip having a tongue in engagement with each of said pair of bars intermediate said rails to secure said bars in their spaced apart relation, and to resist a separation thereof therefrom whereby the article may be firmly gripped by said bars when inserted therebetween.

9. In a bird cage, a body portion comprising spaced bars and horizontally disposed rails, said spaced bars extending between a pair of said horizontally disposed rails and seceured thereto and means extending over and engaging each of a pair of said bars intermediate said pair of rails to resist the separation of said bars and thereby provide a spring grip upon an article engaged by and between said pair of bars to retain said article therebetween the remaining bars being free from engagement with and the action of said means.

10. In a bird cage, a body portion comprising spaced vertically disposed bars and horizontally disposed rails, an article having a portion thereof engaged by and between a pair of said bars, and means intermediate a pair of rails to bind said pair of spaced bars together to provide a spring grip thereof upon said article portion therebetween to retain the same against accidental displacement therefrom.

11. In a bird cage, a body portion including spaced apart bars, each of which are secured at each end to another portion of said cage, and means disposed intermediate the secured ends of a pair of said bars to bind said pair of spaced bars together to provide a spring grip thereof upon an article disposed therebetween, to retain said article against accidental displacement therefrom.

12. In a bird cage, a woven guard-screen wrapped upon the periphery of and about the body portion of said cage, said screen having a rectangular opening therein intermediate its upper and lower edges, and means to cover the rough edges about said opening, comprising a flat metallic plate-like member disposed upon one side of said screen and having a part thereof wrapped over the edges of the opening and disposed upon the other side of said screen, and spaced apart insets formed in said plate-like member upon one side of said screen, and extending through said screen and into the part of said member upon the other side of said screen.

13. In a bird cage, a body portion having bars surrounded by a guard screen, said guard screen having a rectangular opening therein and continuous edges above and below said opening, said screen being secured to the body portion of the cage to expose a pair of the cage bars, a binding to cover the edge of the opening in said screen, said binding comprising a flat rectangular piece of material, said piece of material having a rectangular opening therein, a tongue at each of the side edges of the rectangular opening in said piece of material, and said tongues being passed through said opening in said screen and bent over the edges thereof to secure said binding in place, and a feed cup positioned exteriorly of the cage and having means extending through said opening to be engaged with said bars.

14. In a bird cage, a body portion surrounded by a guard screen, said guard screen having a rectangular opening therein, a binding to cover the edge of the opening in said screen, said binding comprising a flat rectangular piece of material, said piece of material having a rectangular opening therein smaller than the opening in said screen and having mitred slits extending from the edges of said opening toward the corners of the piece of material forming tongues at the side edges of said opening, and said piece of material being applied to the screen with said tongues passed through the opening therein and being bent over the edges of said opening to secure said binding in place.

In witness whereof, I have hereunto set my hand this 30th day of March, 1926.

ALFRED CHADWICK.